Patented Dec. 7, 1937

2,101,574

UNITED STATES PATENT OFFICE 2,101,574

HARDENING OF PROTEINS

Charles Dangelmajer, Niagara Falls, N. Y., assignor to E. I. du Pont de Nemours & Company, Wilmington, Del., a corporation of Delaware No Drawing. Application April 12, 1935,
Serial No. 16,022

6 Claims. (Cl. 91—68)

This invention relates to the hardening of proteins and more particularly to the manufacture of useful compositions containing hardened proteins or protein materials and to processes involving the hardening of proteins.

The present application is a continuation in part of my co-pending application Serial Number 2,751.

It is known that organic tanning agents such as tannic acid, formaldehyde, formaldehyde polymers, acetaldehyde, oak extract and similar materials will react with casein, animal glue and other protein-like substances to render them hard and more or less insoluble in water. These have a number of commercial applications. For example, use is made of the insolubilizing action of formaldehyde on casein in preparing insoluble films on paper, making adhesives and in plastics manufacture. For example, a common practice is to prepare first, a film from an aqueous solution of casein which contains an alkaline agent, such as borax, for rendering the casein soluble. The film then is dried and treated with formaldehyde, tannic acid or similar hardening agent, which causes the film to become relatively insoluble in water. A similar practice is used for hardening animal glue films. Often difficulty is encountered when the films are relatively thick because the hardening takes place on the surface only and pentration of the hardening agent into the film is retarded by the relatively insoluble surface produced by the hardening agent. This can sometimes be avoided by using relatively dilute solutions of hardening agent, such as formaldehyde, which permits the penetration to the desired degree but this method requires long periods of time to effect the desired penetration unless the film is very thin.

Casein, animal glue and other proteins and protein-like substances find wide application in the preparation of adhesives, pastes, leather finishings and dressings, plastics, preparation of composition cork, imitation leather, stenciling paints, coatings for wall paper and wall board, printing inks and numerous other uses. In these cases applications arise where it is desirable to render the protein highly resistant to water. This has been done heretofore by the above mentioned process of exposing the protein to a hardening agent, e. g., formaldehyde or formaldehyde derivatives. In such operations the tendency for the hardening action to prevent or inhibit complete penetration by the hardening agent often causes difficulties and various tedious operations are necessary to overcome this tendency. For example, in making casein plastics, a form is first molded for casein and subsequently hardened by immersion for long periods of time in a dilute solution of formaldehyde.

It is an object of this invention to provide a process for delaying the reaction between protein and protein hardening agents until the final physical form of the protein is attained. It is a further object of this invention to provide a means for inhibiting the reaction between protein materials and their hardening agents. A further object is to provide a process for delaying the hardening action of a hardening agent on a protein material during a pre-determined period of time, after which the hardening action is permitted to occur. A further object of this invention is to provide a solubilizing agent for casein in water which at the same time acts as an inhibiting agent for the reaction of casein with a hardening agent. Another object is to provide a method for applying hardened proteins as adhesives, water resistant coatings and similar applications, wherein compositions containing protein and protein hardening agent may be prepared in which the protein remains substantially unhardened for a desired period of time or until the compositions have been applied and heated or dried. Further objects of this invention include improved methods for the production of water-resistant coatings on paper, textiles and other fibrous materials, manufacture of paints and water proofing compositions and manufacture of protein-base plastics. Other objects will become apparent from the following description.

These objects may be accomplished in accordance with the present invention by subjecting the protein material to the action of a hardening agent in the presence of a fatty acid amide. I have discovered that when a mixture containing protein and fatty acid amide is subjected to the action of a protein hardening material, e. g., tannic acid, formaldehyde or a formaldehyde derivative, the hardening effect is markedly inhibited or delayed by the presence of the fatty acid amide, the degree of inhibition in a given mixture and under given conditions of temperature, etc., being in general proportional to the concentration of the fatty acid amide.

One method of practicing my invention consists in mixing the protein to be hardened with a fatty acid amide and a protein hardening agent, preferably in the presence of water or other solvent. It is usually desirable that the protein in the mixture be in a dissolved or solubilized form. The presence of the amide delays the hardening action until the mixture can be applied when required or molded into a desired shape. Furthermore, since the hardening agent may be uniformly distributed throughout the mixture, the protein is uniformly hardened throughout.

I have further found that in amide-containing mixtures prepared in accordance with the present invention the hardening action may be accelerated by heating and if the composition is heated to around 70° C. or higher or dried at such temperature, the water resistance of the resulting plastic often is markedly increased. Drying the compositions at lower or ordinary temperatures also causes the protein to be hardened in a satisfactory manner.

The water-soluble fatty acid amides used in the herein described invention, in addition to their inhibition of protein hardening, have a certain advantageous solubilizing action on proteins, especially those proteins such as milk casein and certain vegetable proteins which are more or less difficult to dissolve in water. Hence by the use of the fatty acid amides, the amount of strongly alkaline material required to dissolve the protein may be greatly decreased; in many cases the use of such alkaline materials may be dispensed with altogether in practicing my invention. I have found that formamide has a markedly greater solubilizing effect on casein and other proteins than the other water-soluble fatty acid amides and that by the employment of formamide or its aqueous solution, the protein may be dissolved to a practicable extent without the use of strong alkalies.

The following examples serve to illustrate certain specific embodiments of the present invention:

*Example 1*

A solution was prepared which contained the following ingredients.

| | Per cent |
|---|---|
| Casein | 18.9 |
| Formamide | 18.9 |
| 20% aqueous ammonia | 4.0 |
| Water | 56.6 |
| A finely divided, highly polymerized form of formaldehyde known as "Paraform B" | 1.6 |

This mixture formed a uniform solution of a consistency suitable for application as a coating material on paper and paper board. It was kept for a period of weeks without any reaction taking place between the hardening agent and the casein as indicated by no coagulation of the solution. A portion of the solution then was applied in a thin coat to a glass plate and allowed to dry. The water resistance increased over a period of three to five days to produce a film which was not discolored, rendered soft or rendered opaque on contact with water. A paper board then was coated with a portion of the solution, allowed to air dry at room temperature and then further dried in an oven at 80° C. for a period of five hours, at the end of which time the coating showed a high resistance to water.

The formamide in this example acted as a solubilizing agent for the casein and inhibited the reaction of the formaldehyde polymer with the casein. Formaldehyde polymer, in contact with casein dissolved in borax in a similar experiment, coagulated the solution almost at once. It was found that the film which was formed from the above described formamide solution had a better resistance to water and showed more complete coverage than could be obtained with a borax solution of casein which had been subsequently hardened by an aqueous formaldehyde solution.

*Example 2*

A quantity of 100 grams of crude gelatin was disolved in a solution of 500 cc. of water and 50 grams of formamide. To a 50 cc. portion of this solution there was added 10 cc. of commercial 40% formaldehyde solution. The coagulation of the solution which, without the presence of formamide is instantaneous, occurred only after 14 hours. To another 50 cc. portion of this formamide-gelatin solution there was mixed 20 cc. of 5% oak extract solution. No coagulation occurred in six days. When this solution was placed in a thin film upon a glass plate and allowed to dry, a hard, water insoluble film was formed.

*Example 3*

A solution was prepared which contained:

| | Per cent |
|---|---|
| Casein | 23.3 |
| Water | 50.0 |
| Formamide | 23.3 |
| 20% aqueous ammonia | 3.4 |

To 320 grams of this solution there was added 6 grams of a highly polymerized form of formaldehyde suspended in 60 cc. of water and 150 grams of 400 mesh ground quartz. The mixture was stored for a period of one week, with no sign of coagulation. This composition was applied to the surface of a paper board and allowed to dry and age over a period of 3 days. The resulting film was hard, insoluble and impervious to water.

*Example 4*

A solution was prepared which contained:

| | Per cent |
|---|---|
| Casein | 8.9 |
| Formamide | 5.1 |
| 20% aqueous ammonia | 5.1 |
| Water | 50.7 |
| Finely ground quartz | 27.3 |
| Aqueous 40% formaldehyde solution | 2.9 |

This solution did not coagulate over long periods of standing and formed on drying of water insoluble, water resistant film.

*Example 5*

A solution was made which contained:

| | | |
|---|---|---|
| Casein | grams | 70 |
| Acetamide | do | 70 |
| Water | do | 200 |
| 20% aqueous ammonia | cc. | 10 |

This solution was divided into three parts which are indicated as A, B and C. To part A, which was 100 grams, there was added 1.5 grams of a highly polymerized form of formaldehyde, known as "Paraform B", suspended in 5 cc. of water. To part B, which was 50 grams, there was added 2 cc. of 40% commercial formaldehyde solution. To part C, which was 50 grams, there was added one gram of tannic acid. Films were prepared from these solutions on glass plates and allowed to dry. The films after drying were hard, transparent and water insoluble.

*Example 6*

The following solutions were made:

| | a | b | c | d |
|---|---|---|---|---|
| | Percent | Percent | Percent | Percent |
| Casein | 11.3 | 11.2 | 11.1 | 11.0 |
| Formamide | 2.8 | 2.7 | 2.7 | 2.75 |
| Aqua ammonia | 2.45 | 2.4 | 2.4 | 2.4 |
| Formaldehyde | 2.95 | 3.7 | 4.1 | 4.85 |
| Water | 80.5 | 80.0 | 79.7 | 79.0 |

All samples coagulated after the addition of formaldehyde but re-dissolved after standing for 2–3 hours. Sample *d* coagulated again after standing for 12 hours and did not re-dissolve. Sample c became too viscous after standing for 24 hours. Films made of all four samples were of very good quality.

*Example 7*

The folowing solutions were made:

|  | a | b |
|---|---|---|
|  | Grams | Grams |
| Casein | 11.3 | 11.3 |
| Propionamide | 4.5 |  |
| Butyramide |  | 6.0 |
| Aqua ammonia (20%) | 2.2 | 2.2 |
| Water | 102.0 | 102.0 |
| Formaldehyde | 2.5 | 2.5 |

The casein was mixed into the water solution of propionamide and butyramide respectively, aqua ammonia was added and the mixture was heated at 85° C. After cooling the formaldehyde was added. Both mixtures coagulated immediately but re-dissolved after standing for 2 hours.

*Example 8*

The following solutions were prepared:

|  | a | b |
|---|---|---|
|  | Grams | Grams |
| Glue | 10 | 10 |
| Kaolin | 100 | 100 |
| Ferric oxide | 10 | 10 |
| Ammonia (26%) | 1 | 1 |
| Formamide | 2 | 2 |
| Water | 100 | 100 |
| Chromic sulfate |  | 0.4 |

Films from the above solutions were prepared on plate glass. These were dried 10 minutes at 60° C. and then for 15 hours at 32° C. The dried films were hard, but on wetting, the film from solution a rubbed off very readily, while the films from solution b were so insoluble that they could be given a series of rubs with a wet towel without appreciably coloring the latter or injuring the film. Another portion of solution b did not harden on standing at room temperature during a period of 100 hours. Portions of both solutions were spread on a glass plate and heated at 90° C. for one hour. Hard films were formed which were water resistant, similar to those films made with formamide and acetamide as described in foregoing examples.

A useful modification of my invention relates to coating and/or impregnating fibrous materials with hardened protein to make them water resistant or water proof. Fibrous materials which may be so treated include textile fibers and fabrics and paper products, such as wall board and paper webs. For example, my invention provides an improved method for making water proof or "washable" wall paper. Washable wall papers have heretofore been made by coating or printing a paper web with compositions containing a protein, pigments and/or fillers and water and then treating the printed or coated paper with a protein hardening agent. Thus, this prior method involves two distinct steps: (1) coating with a protein composition and (2) treatment to harden or "fix" the protein. Such two-stage method has been necessary because heretofore it has not been feasible to incorporate the hardening agent in the coating or printing compositions; if this is done, the protein becomes coagulated before or during the printing or coating operations and is unfit for further use. Furthermore, certain commonly used pigments tend to harden proteins and these often cause premature coagulation of the protein, thus making operation difficult.

By means of my invention I am able to produce washable wall paper and like coated fibrous articles in a single step in place of the two steps described above. To practice this modification of the invention, I prepare a printing or coating composition containing a protein, a protein hardening agent, suitable pigments and/or filler and sufficient of a water soluble fatty acid amide to prevent hardening of the protein for a desired length of time. The coating compositions ordinarily will be prepared with water as solvent or suspending medium. The protein preferably will be in solution or in partial solution in the composition. If desired, various known protein solvents or softeners, e. g., alkalies, may be added to further solubilize the protein. The composition is printed or coated on the paper in the usual manner and the coated paper then is dried. The drying may occur at any suitable temperature; we prefer to dry the coated paper at temperatures of 30° to 50° C. or hotter, in which case the drying operation may require from 5 to 10 minutes.

It has been found that many pigments and filling materials used in compositions suitable for coating wall papers and the like act to a greater or less extent to coagulate protein material, and/or catalyze the reaction between protein and protein hardening agents. Hence the optimum proportion of fatty acid amides will depend to some extent upon the nature of the pigments and those pigments which have a smaller protein coagulating or catalytic effect will require smaller amounts of formamide to prevent coagulation of the protein before the composition is placed on the paper. When using formamide in the paper coating composition, I prefer to use about 1-3% by volume of formamide. If more of the fatty acid amide is used, e. g. around 5% or more of formamide, the hardening effect of the protein on subsequent drying of the coated paper is decreased somewhat giving a softer and somewhat less durable coating on the finished product, which in some cases may be undesirable. On the other hand, if too little fatty acid amide is used the protein material may be coagulated while standing before it is applied to the paper. In general, such compositions should contain not less than about 0.5% by volume of formamide. If other fatty acid amides are used to replace the formamide, correspondingly larger amounts should be used.

Proteins which have been used heretofore in other processes for waterproofing paper or other fibrous materials are in general suitable for practicing my invention. Examples of such materials are animal glue, or gelatine, albumen, casein, soy bean meal or protein extracted from soy beans or other types of vegetable and animal protein material. The concentration of protein in the coating composition will depend upon the results desired (e. g. the degree of waterproofing desired), the nature of the pigment and the nature of the protein. The range of protein composition thus may vary widely depending upon these various considerations. I have obtained the best results by using compositions containing from 4 to 7% by weight of protein material, e. g. animal glue or casein. However, the present invention is not restricted to any particular concentration or proportion of protein material nor to any particular type of protein, providing that the protein utilized is capable of being hardened by simple chemical treatment. Also in general, I prefer that the amount of protein be equivalent to about 11% by weight of the total amount of pigment and/or filler used in the composition.

Various chemicals and substances which are known to harden protein material are suitable for practicing the present invention to waterproof paper and the like. The concentration of the hardening agent may be varied considerably depending upon the respective natures of the hardening agent, protein, pigment and the fatty acid amide and the respective concentrations of these ingredients. It is requisite that the concentrations of the various ingredients be so adjusted one to the other that the total hardening effect of the protein hardening agents and the treatment used is inhibited by the fatty acid amide present so that substantially no coagulation of the protein will occur when the composition is allowed to stand for a reasonable length of time.

When using formaldehyde as the protein hardening agent, I prefer to use from 0.75 to 1.5 volumes of formaldehyde solution commercial for each 100 volumes of the paper coating composition. If paraform or other formaldehyde derivatives or polymers is used, I prefer to use them in the amount equivalent to the above amounts of formaldehyde solution.

Superior results in coating paper are often obtained by using as protein hardening agent a formaldehyde derivative or polymer, e. g. paraformaldehyde, which tends to release formaldehyde vapors. This is because when formaldehyde solution is used as a hardening agent, some formaldehyde ordinarily is volatilized during the drying step and thus its effect as hardening agent is lost. The hardening effect is thereby correspondingly decreased. By the use of a formaldehyde liberating material such as paraform, the amount of formaldehyde volatilized during the drying step is greatly decreased or eliminated altogether and during the drying operation the paraformaldehyde acts to slowly liberate formaldehyde which is used to react with protein to harden it substantially as fast as it is liberated. The use of paraformaldehyde and the like is especially useful when a maximum hardening action is desired and its use is ordinarily advisable when inorganic pigments such as iron oxide are used in the coating composition. I may also utilize mixtures of various hardening agents in place of a single hardening agent and in such cases it is often advantageous to use a mixture of formaldehyde and a formaldehyde derivative, e. g. paraformaldehyde, hexamethylenetetramine or the like.

The following examples illustrate the application of water resistant, pigmented coatings to paper in accordance with the hereindescribed invention:—

*Example 9*

A coating stock was made by mixing the following:

| | Parts by weight |
|---|---|
| Kaolin | 90 |
| Pigment—green aniline dye supported on barium sulfate | 10 |
| Glue | 11 |
| Water | 120 |

To 100 parts by volume of the above mixture, 37% formaldehyde solution and formamide were added as shown in the following table. The time required for the solutions to coagulate at room temperature was determined with the results indicated in the table. Wall paper stock was coated with the composition and the coated paper was dried at 35° C. for 10 minutes and then at room temperature for 48 hours. The washable characteristics of the coated paper were determined by wiping the dried coatings with a wet sponge, with the results shown.

| Coating composition | Formaldehyde added | Formamide added | Time of coagulation | Washability |
|---|---|---|---|---|
| | Percent by vol. | Percent by vol. | Hours | |
| 1 | 0.75 | None | Less than 16 | Fully washable. |
| 2 | 0.75 | 0.75 | 48 | Do. |
| 3 | 0.75 | 1.0 | 48 | Do. |
| 4 | 0.75 | 1.5 | 48 | Do. |
| 5 | 0.75 | 2.25 | 120 | Do. |
| 6 | 1.0 | None | Less than 16 | Do. |
| 7 | 1.0 | 0.75 | 24 | Do. |
| 8 | 1.0 | 1.5 | 48 | Do. |
| 9 | 1.0 | 2.0 | 48 | Do. |
| 10 | 1.0 | 3.0 | 120 | 98% washable. |
| 11 | 1.25 | None | Less than 16 | Fully washable. |
| 12 | 1.25 | 1.0 | Less than 24 | Do. |
| 13 | 1.25 | 1.5 | 24 | Do. |
| 14 | 1.25 | 2.0 | 48 | Do. |
| 15 | 1.25 | 3.75 | More than 144 | 98% washable. |
| 16 (blank) | None | None | 144 | Not washable. |

Papers coated with the blank solution (#16) lost practically all their color in 20 light rubs with a wet sponge, whereas even the poorest of the other samples (Nos. 10 and 15) showed only a barely visible removal of pigment when rubbed with a wet paper towel after the wet sponge treatment. The time of coagulation of the mixtures was delayed from 24 to over 100 hours by the formamide, given ample time for their utilization in mill practice.

*Example 10*

The procedure of Example 9 was repeated, except that ferric hydrate was substituted for the green pigment and paraformaldehyde was used in addition to or in place of formaldehyde in most of the tests. The results obtained are given in the following table:—

| Coating composition | Percent by wt. paraformaldehyde | Percent by vol. formaldehyde | Percent by vol. formamide | Time of coagulation (hrs.) | Washability |
|---|---|---|---|---|---|
| 1 | 0.5 | 0 | 0 | Less than 16 | Fully washable. |
| 2 | 0.5 | 0 | 1 | 72 | Do. |
| 3 | 0.5 | 0 | 2 | 96 | 98% washable. |
| 4 | 0.25 | 0 | 0 | 72 | Do. |
| 5 | 0.25 | 1 | 1 | 48 | Fully washable. |
| 6 | 0.25 | 1 | 2 | 96 | Do. |
| 7 | 0 | 1 | 1 | 96 | Do. |
| 8 | 0 | 1 | 2 | 120 | Do. |
| 9 | 0.25 | 1 | 1 | 96 | Do. |
| 10 | 0.25 | 0 | 1 | 48 | 98% washable. |
| 11 | 0.5 | 0 | 0 | Less than 16 | Fully washable. |
| 12 | 0.5 | 0 | 1 | 96 | Do. |
| 13 | 0.5 | 1 | 1 | 24 | Do. |
| 14 | 0.5 | 0.5 | 1 | 24 | Do. |
| 15 | 0.5 | 1 | 1 | 24 | Do. |
| 16 | 0.5 | 1 | 2 | 48 | Do. |
| 17 (blank) | | | | Less than 16 | Do. |

Another method of practicing the present invention may be utilized to effect penetration of protein hardening agent into protein or protein containing materials. According to this method, the fatty acid amide is mixed with either the protein material or with the hardening agent, or both, prior to contacting the portion with the hardening agent. For example, in the manufacture of protein base plastics, e. g., casein plastics, a composition may be made containing a protein and a fatty acid amide, with or without filler, pigment, etc., this moulded or otherwise formed into cakes, films or other desired shapes and finally treated with a protein hardening agent.

As indicated by the above examples, the amount of fatty acid amide employed in practicing the present invention may be varied between wide limits, depending on the effect desired and the nature and proportions of other ingredients. In some cases, where the amount of fatty acid amide employed is relatively small, a partial coagulation of the protein occurs when the hardening agent is added, but if sufficient of the amide is present, the coagulated material is re-dissolved on standing. If too little of the amide is present, the coagulated material will not re-dissolve on standing. In practicing my invention, I employ a fatty acid amide concentration not less than that required to re-dissolve any coagulated protein which is formed on addition of the hardening agent. The minimum amount of the amide to be employed will vary, depending on the respective natures of the protein and hardening agent employed and the presence of conditions and/or ingredients which affect the hardening action. If sufficient of the amide is employed, compositions containing protein and protein hardening agents may be prepared which may be stored for long periods of time at ordinary temperatures with substantially no hardening or coagulation of the protein. Such compositions when subjected to heat or to drying conditions may be transformed readily to hard, horn-like masses which are highly water resistant. For example, liquid compositions of this sort may be prepared which are valuable for producing films, for adhesive purposes or for coating paper, textiles and other fibrous materials.

The herein described invention is applicable to the hardening of various proteins or protein-containing materials of both animal or vegetable origin. The various known protein hardening agents are suitable for practicing my invention, for example, phenolic hardening agents such as tannic acid, inorganic hardening agents, e. g., chromium salts, or aldehydes such as formaldehyde. In place of formaldehyde, the various formaldehyde derivatives and substances capable of liberating formaldehyde, including polymeric forms of formaldehyde, may be used. Throughout this specification and in the appended claims, the term "formaldehyde derivatives" is used to include the polymeric form of formaldehyde as well as other formaldehyde derivatives and formaldehyde liberating compounds which are suitable for use as protein hardening agents. The invention is capable of a wide variety of uses wherever it is desired to react protein material with a protein hardening agent. Among such uses are: sizing and water-proofing of textiles, paper and other fibrous materials; artificial resins, e. g., casein plastics, waterpaints and inks.

In preparing the various compositions, i. e., plastics, solutions, pastes and the like according to the present invention, various fillers, pigments, dyes, solvents and the like may be employed as commonly used in preparing compositions of like types.

I claim:

1. A process comprising coating fibrous material with a composition comprising protein, a protein hardening agent, pigment and a water soluble fatty acid amide and drying the coated material.

2. A process comprising coating fibrous material with a composition comprising protein, a protein hardening agent, pigment, and formamide and drying the coated material.

3. A process comprising coating paper with a composition comprising protein, a formaldehyde derivative, formamide and a pigment and drying the coated material.

4. A process comprising coating paper with a composition comprising protein, formaldehyde and at least about 0.5% by volume of formamide and drying the coated material.

5. A process comprising coating paper with a composition comprising casein, formaldehyde, formamide and a pigment and drying the coated material at an elevated temperature.

6. A process comprising coating paper with a composition comprising animal glue, formaldehyde and a pigment and about 0.5 to 3% by volume of formamide and drying the coated material.

CHARLES DANGELMAJER.